Nov. 24, 1964

J. F. LAYCAK ET AL 3,158,748

ELECTRONIC SURFACE INSPECTION SYSTEM
EMPLOYING FULL FRAME SCANNING

Filed Nov. 21, 1961

INVENTORS
John F. Laycak
Reginald D. Langman
& Angelo Domina

BY Murray & Young
ATTORNEYS

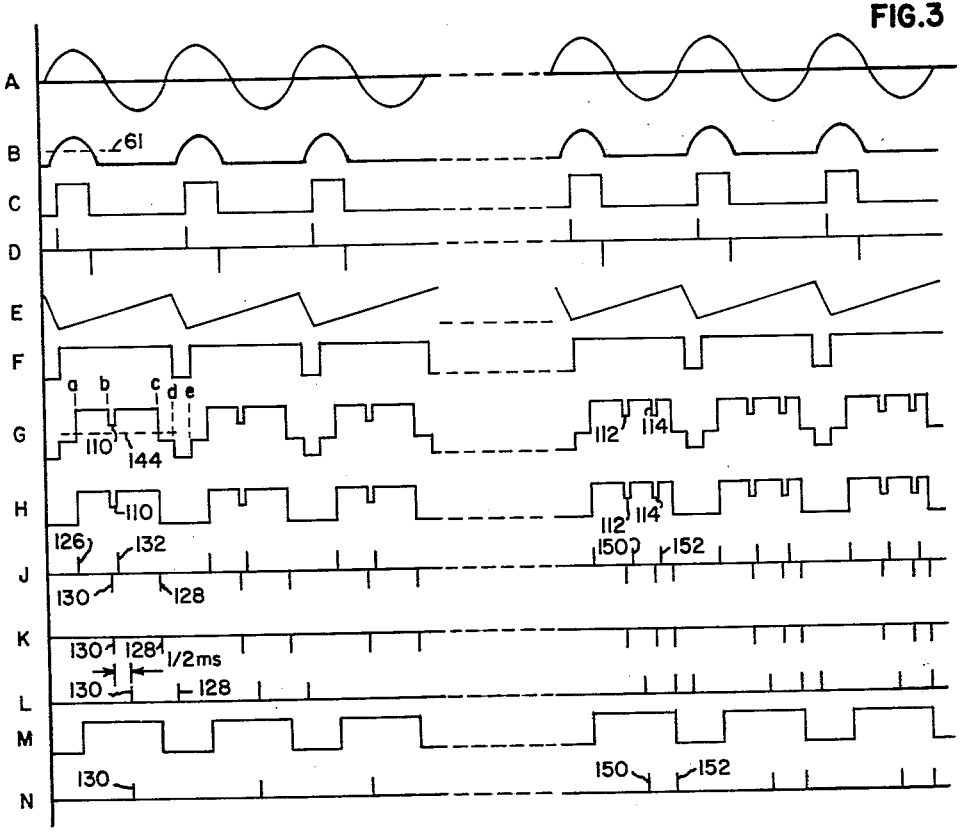
FIG.3
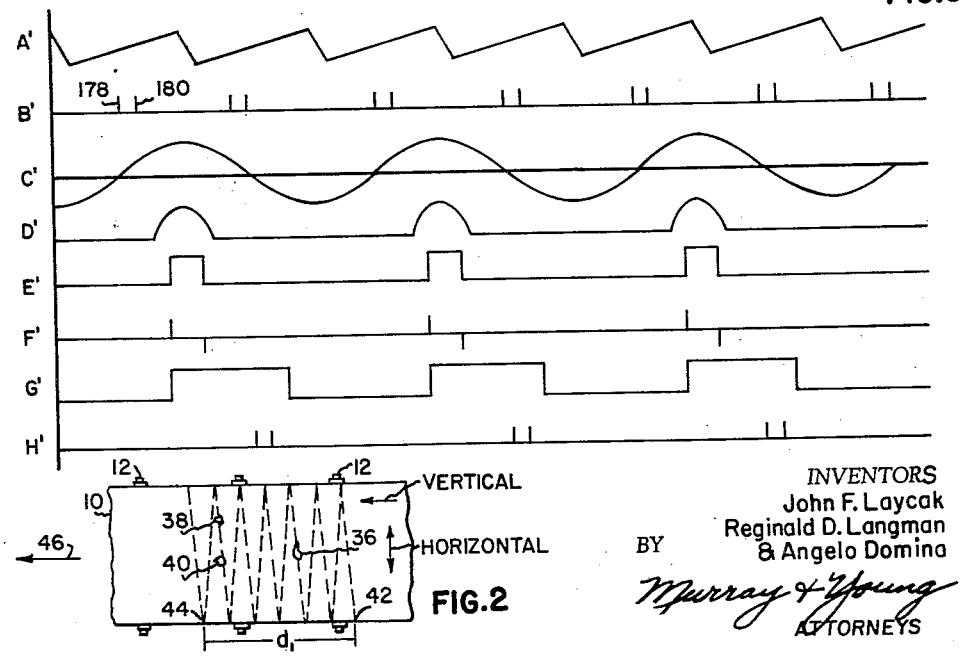
FIG.5
FIG.2
INVENTORS
John F. Laycak
Reginald D. Langman
& Angelo Domina
BY
Murray & Young
ATTORNEYS

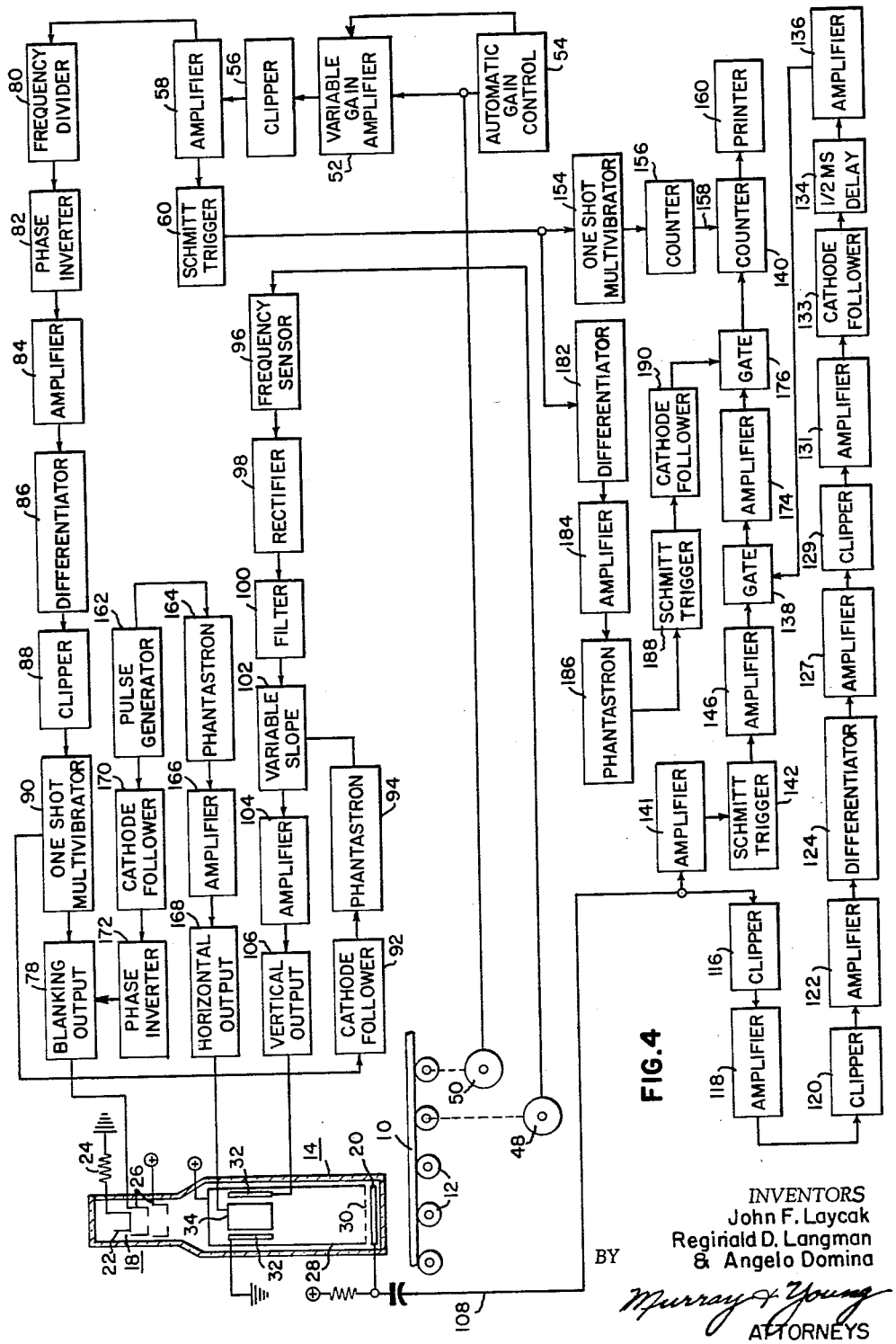

3,158,748
ELECTRONIC SURFACE INSPECTION SYSTEM
EMPLOYING FULL FRAME SCANNING
John Francis Laycak and Angelo Domina, Pittsburgh, Pa., and Reginald David Langman, Moorgate, Rotherham, England, assignors to Jones & Laughlin Steel Corporation, Pittsburgh, Pa., a corporation of Pennsylvania
Filed Nov. 21, 1961, Ser. No. 153,901
14 Claims. (Cl. 250—219)

This invention relates to a system adapted to inspect the surface of material for imperfections and quality where the imperfections have a different optical appearance than the remainder of the material as, for example, where the imperfections are discernible by differences in color, emitted light, reflected light, or combinations of these. More particularly, the invention relates to a surface inspection system of the type described wherein an electron-optics device utilizing full frame scanning is employed to inspect the surface of moving material.

The present invention is based upon the fact that in most materials the surface defects have a different optical appearance than the remainder of the material. For example, in the case of a reflective surface, defects will generally have a lower light intensity and appear darker than the remainder of the material when light is directed thereon. Similarly, in the case of an irradiant hot object, defects will appear brighter or darker than the main body of the material. These differences in intensity may be converted, by means of a photosensitive device, into electrical current variations which, in turn, may be used to indicate the presence of a defect, or for control purposes. If the defects have a different color than the remainder of the material, suitable filters may be employed whereby only a particular color or colors will activate a photosensitive device to produce an electrical current variation with the same result as that achieved with an irradiant or reflective surface.

In the past, systems have been devised for inspecting the surface of moving material wherein an electron-optics device, such as a vidicon, is employed to scan an image of the surface of the moving material with an electron beam along a straight-line path extending transverse to the direction of movement of the material, the arrangement being such that each time the electron beam intersects the image of a defect which has a different optical appearance than the remainder of the material, it will produce an output pulse. If the scanning frequency varies as a function of the speed of the moving material, or if some other type of speed compensation is employed, an indication of the number of defects on the material may be obtained by counting pulses at the output of the electron-optics device.

One difficulty with single line scanning systems of the type described above is that the photosensitive surface in an electron-optics device such as a vidicon has certain lag characteristics, meaning that once the electron beam sweeps across the photosensitive surface, a charge is produced on that surface which takes a period of time to decay back to the point where the photosensitive surface is again at its quiescent or normal state. In single line scanning, the electron beam is repetitively swept back and forth along the same line, with the result that the charge on the surface never falls to its quiescent state, but is maintained at a higher voltage. As a result, any charge on the signal plate due to a defect on the surface of material being inspected will have a lower amplitude with respect to the charge maintained on the surface by repetitive scanning along a single line than it ordinarily would if the surface charge were given an opportunity to decay as it is, for example, in full frame scanning. Consequently, it becomes difficult to distinguish defects from the remainder of the surface of the material with single line scanning, especially when the material being inspected is moving at high speed and under conditions where the defects vary only slightly in optical appearance from the remainder of the surface of the material.

As an overall object, the present invention seeks to provide a new and improved surface inspection system which overcomes the above and other disadvantages of prior art systems.

More specifically, an object of the invention is to provide an electronic surface inspection system for moving material wherein full frame scanning of the photosensitive surface of an electron-optics device is employed to effect improved sensitivity in detecting defects and to vitiate the limitation of slow response photosensitive pickups relative to the high speeds at which the product to be inspected travels.

Another object of the invention resides in the provision of a surface inspection system for moving material in which the output of the system will always be the same for a given surface imperfection condition regardless of the speed of the material being inspected.

Still another object of the invention resides in the provision of a surface inspection system which will individually inspect the surface of successive lengths of material and produce an output signal whenever the character of the defects in each individual or successive length exceeds a predetermined condition.

In accordance with the invention, hereinafter described in detail, the material to be inspected travels over a conveyor. Disposed above the conveyor is an electron-optics pickup device, such as a vidicon, adapted to scan the surface of the material traveling over the conveyor with an electron beam. The vidicon or other photosensitive device operates on a full frame scan. That is, the electron beam of the photosensitive device moves back and forth transverse to the direction of the movement of the material as well as parallel thereto, the transverse scanning frequency being much higher than the scanning frequency parallel to the direction of movement. In this respect, the transverse scan corresponds to the "horizontal" scan in a conventional full frame TV camera tube; whereas the scan parallel to the direction of movement corresponds to the "vertical" scan of a conventional TV tube. If the material being inspected is hot and irradiant, defects on its surface will appear brighter or darker than the remainder of the material and, thus, will have a different optical appearance. Similarly, if a reflective material is being inspected such as tinplate or stainless steel, the surface of the material within the field scanned by the photosensitive device may be illuminated by external means. In this latter case, defects appearing on the surface of the reflective material will have a lower reflectivity and appear darker. If the material being inspected is such that defects have a different color than the remainder of the material, suitable filters may be disposed between the surface and the electron-optics pickup device whereby a different optical appearance of the defects, as they appear to the pickup device, will be achieved. In any of these cases, the electron beam of the photosensitive pickup device will scan across the surface of the material being inspected to produce a video signal in which a relatively long pulse is produced for each transverse or "horizontal" scan of the electron beam, this pulse being produced as the beam scans across the width of the illuminated or irradiant surface of the moving material. Superimposed on this long pulse are short pulses which arise when the electron beam scans over the image of defects of different optical appearance, the width of each pulse being proportional to the width, along the scanning line, of the defect it represents. The video signal, after suitable shaping, is differentiated to produce a short spiked pulse of one polarity at one edge of each pulse in the video signal and a short spiked pulse of the opposite polarity at the other edge of each pulse in the original video signal. By eliminating the spiked pulses of one polarity, only a single spiked pulse will remain in the resultant signal for each pulse in the original video signal. Thereafter, by eliminating the spiked pulse due to the relatively long pulse produced when the electron beam scans over an image of the surface being inspected, only those spiked pulses due to defects will remain; and by counting the remaining spiked pulses, an indication of the condition of the surface of the material being inspected will be obtained.

It will be apparent that in order to obtain an accurate indication of the surface condition of the material being inspected, the electron beam should scan over each incremental length of the material only once. Accordingly, the "vertical" scanning frequency of the electron beam (i.e., that parallel to the direction of movement of the material) must vary as a function of the speed of the material being inspected. Furthermore, assuming that the "vertical" scanning frequency does vary as a function of speed, a scan velocity greater than the surface velocity of the material being inspected must be employed, the scan velocity preferably being twice that of the velocity of the material being inspected in order to obtain complete inspection of the surface.

It will also be seen that if the transverse or "horizontal" scanning frequency for the electron beam is constant, the total number of defect pulses produced for any given length of the material will be a function of its speed. That is, if the material travels along its conveyor at a high rate of speed, a fewer number of defect pulses will be produced during one foot of travel than would be produced for the same foot of travel if the speed of the body were decreased. Since it is desired to obtain an indication of the number of defects over a given length of the body, and since the number of defect pulses is dependent upon the speed of the body, some means must be provided to insure that the number of defect pulses will be the same for a particular length of the material regardless of its speed. Otherwise, the output of the system will not be a true indication of the total number of defects.

Accordingly, in one embodiment of the invention described herein, speed compensation is achieved by regulating the transverse or horizontal sweep repetition rate of the electron beam of the photosensitive pickup device whereby it is proportional to the speed of the material being inspected. In this manner, the defect pulses will always be the same regardless of the speed of the material. In another embodiment of the invention, a gating signal is produced having a number of pulses therein proportional to the speed of the material being inspected. By gating the defect pulses at the output of the photosensitive pickup device with this gating signal, only a number of the defect pulses proportional to the speed of the body will remain. Thus, if the material is traveling rapidly, a greater number of defect pulses will be fed to a counter or other similar device over a given time interval than will be fed over the same time interval when the speed of the material is decreased. In this manner, the number of defect pulses fed to the counter will always be the same for a given defect condition regardless of speed.

The above and other objects and features of the invention will become apparent from the following detailed description taken in connection with the accompanying drawings which form a part of this specification, and in which:

FIG. 2 is a schematic illustration of the full frame scan effected by the circuit of FIG. 1;

FIG. 3 illustrates wave forms appearing at various points in the circuit of FIG. 1;

Figure 1:
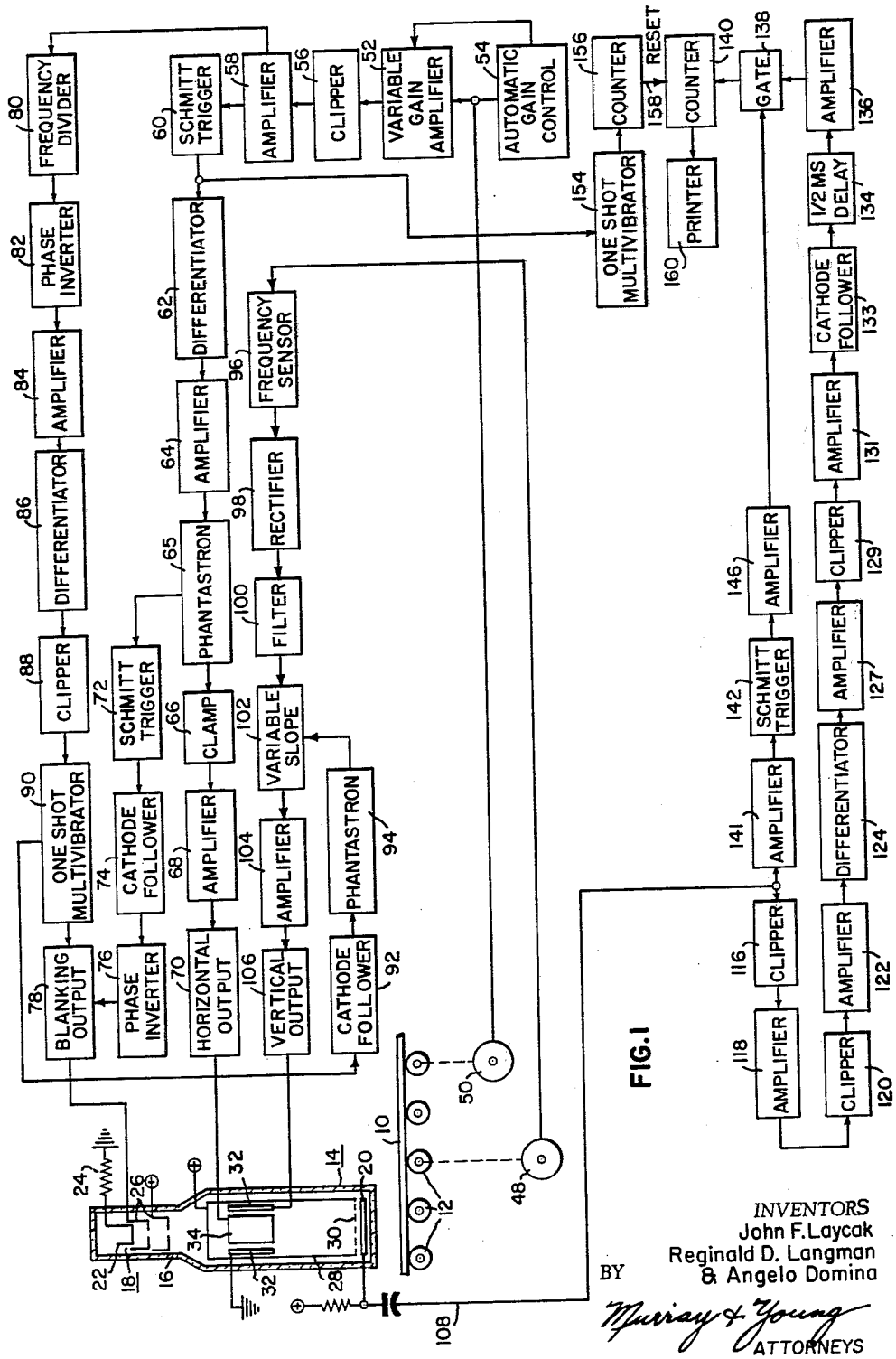
FIGURE 1 is a block schematic circuit diagram of one embodiment of the present inventon which employs a variable transverse or "horizontal" sweep repetition frequency to compensate for variations in speed of the material being inspected.

FIG. 4 is a schematic block diagram of another embodiment of the invention wherein the transverse or "horizontal" scanning frequency is constant, and wherein speed compensation is achieved by means of gating pulses having a recurrence frequency proportional to the speed of the material being inspected; and FIG. 5 is an illustration of wave forms appearing at various points in the circuit of FIG. 4.

Referring now to FIG. 1, the object being inspected is illustrated as a strip of material 10, such as reflective tinplate or stainless steel, which moves along conveyor rolls 12. As will be understood, a wide band across the strip 10 is illuminated by means, not shown, the illuminated area being at least equal to that scanned by an electron-optics device such as an electrostatic vidicon 14 positioned above the strip 10. Although the material shown herein as being inspected is reflective, it should be understood that the material may be an irradiant steel slab, the important thing being that the object has a different light intensity, or at least a different optical appearance, than the background surrounding it.

The electrostatic vidicon 14 consists of an evacuated glass cylinder 16 containing an electron gun 18 at one end and a photoconductive signal plate or target 20 at the other end. The electron gun 18 consists of an indirectly heated cathode 22 which may be connected to ground through resistor 24, one or more control grids 26, and a wall or focusing anode 28. The focusing anode 28, being cylindrical in shape, extends for most of the length of the tube and is connected to a screen 30 situated near the photoconductive target 20. The target 20 comprises a light sensitive element consisting of a thin layer of photoconductive material disposed on a signal electrode. As will be seen, the photoconductive material should be such as to have very little photoconductive lag, meaning that a signal will build up on the material as an electron beam sweeps thereacross in a short period of time with a minimum amount of delay or lag. Disposed within the vidicon are a pair of vertical electrostatic deflection plates 32 and a pair of horizontal electrostatic deflection plates 34. The plates 32 are at right angles to plates 34, it being understood that only one of such plates 34 is shown in FIG. 1 due to the fact that the vidicon is shown in cross section, the other horizontal deflection plate 34 being disposed above the plane of the drawing and parallel thereto.

Referring now to FIG. 2, the scanning field of the electron-optics device 14 is shown as extending across the width of the material 10 and along the length thereof for a distance $d_1$. By applying a high scanning frequency to the horizontal deflection plates 34 while applying a lower scanning frequency to the vertical deflection plates 32, the electron beam will scan back and forth across the width of the material 10 many times as it scans along the distance $d_1$ once. The general back-and-forth path of travel of the beam is schematically illustrated by the dotted line in FIG. 2, it being understood that in actual practice the spacing between the transverse scans will be much less than that illustrated due to the fact that the transverse or horizontal scanning frequency is on the order of 260 times that of the vertical scanning frequency. As the electron beam scans over its field, it will intersect defects on the surface of strip 10, which defects are numbered 36, 38 and 40. Furthermore, as will hereinafter be seen, each time the electron beam intersects a defect 36, 38 or 40 it will produce a pulse in its video output signal to indicate the existence of the defect. In the scanning cycle, the electron beam starts at point 42, for example, scans back and forth across the width of the material 10 while advancing forwardly and terminates at point 44, at which time it "flies back" to point 42 and repeats the cycle. In order to give a true indication of the condition of the surface of strip 10 it is, of course, necessary to scan over each defect once, and only once; and this is controlled by the vertical scanning velocity of the electron beam. In order to scan each defect only once, the vertical scan velocity should be approximately twice that of the strip 10 in the direction of arrow 46. Thus, if it is assumed that defect 36 has just entered the field of scan from the right as viewed in FIG. 2, it will be scanned by the electron beam which moves to the left at twice the speed of the strip 10 in the direction of arrow 46, while scanning back and forth across the width of the strip, and will reach point 44 after the defect 36 has traveled one half the distance $d_1$, this being due to the fact that the speed of the material 10 and defect 36 is one half that of the vertical scanning velocity of the electron beam. As soon as the beam reaches point 44 it will repeat the scanning cycle from point 42, moving across the distance $d_1$ in one half the time required for the defect 36 to move thereacross. By the time the electron beam again traverses the distance $d_1$, the defect 36 will have moved out of the field of scan so that it is not scanned again. Thus, any point on the material 10 is scanned only once by virtue of the fact that the vertical scanning velocity is approximately twice that of the speed of the material 10. If the vertical scanning velocity is increased over a ratio of two to one, then certain areas of the surface will be scanned twice; whereas if the vertical scanning velocity is decreased over the two to one ratio, then certain areas of the surface of material 10 will not be scanned.

Since the vertical scanning velocity should bear a distinct ratio with respect to the linear velocity of the material 10, it can be seen that the vertical scanning velocity must vary as a function of strip velocity. Also, the number of pulses produced in the video output signal of the vidicon due to defects will be a function of both the horizontal scanning velocity and the linear velocity of the material 10. That is, if it is assumed that the horizontal scanning velocity is fixed and that the electron beam sweeps back and forth across defect 36 one thousand times, for example, while the strip or material 10 is moving at one speed, then the electron beam at the same horizontal scanning frequency will sweep back and forth across the defect 36 only 500 times if the speed of the material 10 is doubled. Thus, the horizontal scanning frequency must also vary as a function of the linear velocity of the material 10, or some other type of speed compensation, such as the gating arrangement hereinafter described, must be employed to insure that the number of defect pulses at the output of the electron-optics device 14 is the same for a given defect condition regardless of strip speed.

Circuitry for effecting full frame scanning wherein both the horizontal and vertical scanning frequencies vary as function of the speed of the material 10 is shown in FIG. 1. Two tachometer generators 48 and 50 are connected to the conveyor rolls 12. Generator 50 is connected to a variable gain amplifier 52 as well as an automatic gain control circuit 54 which controls the gain of amplifier 52 in the usual manner to produce a constant amplitude sine wave output regardless of variations in input amplitude due to changes in the speed of strip 10. With reference to FIG. 3, the output of the tachometer generator 50 appears as wave form A and is the usual sine wave. After passing through clipper 56, the negative half cycles of the sine wave are removed so that the wave form now appears as wave form B in FIG. 3. The wave form is then passed through amplifier 58 to a Schmitt trigger circuit 60. As is well known, the Schmitt trigger circuit is a multivibrator having two electron valves therein, only one of which conducts at any one time. The multivibrator may be switched from one of its two conducting states to the other whenever an input signal applied thereto exceeds a predetermined voltage level, such level being indicated by the dotted line 61 on wave form B. Thus, the wave form at the output of the Schmitt trigger 60 appears as wave form C. This wave form is differentiated in differentiator 62 to produce wave form D in FIG. 3 wherein a sharp spiked pulse is produced at the leading and trailing edge of each of the pulses in wave form C, the spiked pulses at the leading edge of each pulse in wave form C being of positive polarity while the spiked pulses at the trailing edge of each pulse in wave form C are of negative polarity. The differentiated pulses are passed through amplifier 64 to a phantastron circuit 65 which will be triggered by each of the positive spiked pulses in wave form D to produce a series of sawtooth configurations such as that shown by wave form E in FIG. 3. The sawtooth wave form E is passed through clamp 66, amplifier 68 and horizontal output circuit 70 to the horizontal deflection plates 34. Thus, wave form E is that which causes the electron beam of the vidicon to sweep back and forth along the horizontal or transverse dimension shown in FIG. 2. The scanning frequency in the horizontal direction is relatively high, being on the range of about 15,000 to 16,000 cycles per second. The RC time constant of the phantastron circuit is adjusted to maintain a constant scan time for each of the sawtooth configurations in wave form E, however the recurrence frequency of the wave form is a function of the frequency of wave form A which, in turn, is a function of the speed of strip 10.

The sawtooth output wave form of phantastron 65 (wave form E) is also passed through a Schmitt trigger circuit 72 and cathode follower 74 to a phase inverter 76. The output of the phase inverter will appear as wave form F in FIG. 3 wherein a negative pulse persists during the "flyback" time of the electron beam in the horizontal direction. The negative blanking pulses in wave form F are applied through blanking output circuit 78 to the control grid 26 of the vidicon 14 whereby the electron beam is cut off during the persistence of a negative pulse in wave form F. Alternatively, the pulses in wave form F could be positive, rather than negative, and applied to the cathode 22 with the same overall effect.

It can be seen that if only that circuitry already described were employed, the electron beam would scan back and forth across an image of the surface of material 10 along a straight-line path. In order to effect full frame scanning wherein the electron beam scans in both the horizontal and vertical directions, it is necessary to apply a sawtooth wave to the vertical deflection plates 32, the frequency of this latter wave being much lower than that applied to the horizontal deflection plates 34. In the present instance, it will be assumed that the vertical scanning frequency is in the range of about 60 cycles per second. Accordingly, the output of amplifier 58, which is amplified wave form B, is fed to a frequency divider 80 which reduces the frequency to about 60 cycles per second, the exact frequency being a function of the speed of strip 10. From frequency divider 80, the signal passes through a phase inverter 82 and amplifier 84 to differentiator 86 which will produce an output signal similar to wave form D in FIG. 3, but wherein the frequency of the spiked pulses is greatly reduced. The differentiated pulses, after passing through clipper 88 are fed to a one-shot multivibrator 90 which produces a blanking output pulse to circuit 78 for the vertical scan. The blanking pulses from multivibrator 90 are similar to those shown in wave form F of FIG. 3 with the exception that they are reduced in frequency.

The output of the one-shot multivibrator 90, being pulses which occur at a frequency of 60 cycles per second, are applied through cathode follower 92 to a phantastron 94 similar to the phantastron 65 already described. The output of the phantastron 94 will, therefore, be a series of sawtooth configurations occurring at a frequency of about 60 cycles per second as contrasted with the output of phantastron 65 which is at a frequency in the range of about 15,000 to 16,000 cycles per second. Since the phantastron 94, in the first instance, is controlled by the tachometer generator 50, the frequency of its output sawtooth wave form will also vary as a function of the speed of strip 10. However, as the frequency of the sawtooth wave form varies, the slope of the sawtooth will also vary as well as its maximum amplitude. Consequently, in order to insure that the electron beam will always sweep through the full distance $d_1$ shown in FIG. 2, some means must be provided to insure that the amplitude of the sawtooth wave form applied to the vertical deflection plates will always be the same regardless of its frequency. For this purpose, the output of tachometer generator 48 is applied to a frequency sensor 96, the output of the frequency sensor being applied to a rectifier 98 and filter 100 which applies the rectified voltage to a variable slope circuit 102 which compensates for variations in the slope and amplitude at the output of phantastron 94 in response to changes in frequency. Thus, the output of circuit 102 is a sawtooth wave form of constant amplitude regardless of frequency. This wave form is applied through amplifier 104 and vertical output circuit 106 to the vertical deflection plates 32 in the vidicon 14.

The video output wave form on signal plate 20 of vidicon 14 appears on lead 108. This wave form, illustrated as wave form G in FIG. 3, is a series of relatively long pulses having superimposed thereon short pulses indicating the presence of defects. It will be apparent from wave form G that as the electron beam sweeps from one side of the conveyor to the other, it will first scan the dark background portion of the conveyor until it reaches point $a$ which is the edge of the strip or other material 10. After intersecting the edge of the strip, the voltage of the video wave form increases because of the greater light intensity of the strip. At point $b$, the electron beam intersects the defect 36 shown in FIG. 2, for example. This defect has a lesser reflectivity than the remainder of the strip; and, consequently, a negative pulse 110 is produced in the wave form. Finally, at point $c$ in the wave form the electron beam leaves the edge of the strip and the voltage decreases due to the dark background of the conveyor. Between points $d$ and $e$, the electron beam returns to its original starting position over a very short interval of time, and the cycle is repeated. As the electron beam continues to scan in the vertical direction, it will intersect the defects 38 and 40 many cycles later. Since the defects 38 and 40 are aligned across the width of the strip, they will produce two pulses 112 and 114 in the video wave form. The pulses 110, 112 and 114 will repeat in the wave form for as many times as the defects which they represent are scanned by the electron beam, however each defect will be scanned only once, as was explained above, due to the fact that the vertical scanning velocity is twice the linear speed of strip 10.

Reverting again to FIG. 1, from lead 108 the wave form G is passed through a first clipper 116 and a first amplifier 118 to a second clipper 120 and a second amplifier 122. The function of the first clipper 116 is to remove the lower portion of the video wave form G so that only the pulse between points $a$ and $c$ remains. Circuit 118 amplifies the wave form and clipper 120 refines the clipping action so as to insure that clean pulses of high amplitude appear at the output of amplifier 122. These pulses, then, appear as wave form H in FIG. 3 and are passed to a differentiator 124. The voltage wave form appearing at the output of the differentiator will be a series of sharp voltage pulses which occur in time at the points where the input square wave signal changes from one voltage level to another. This wave form is illustrated as wave form J in FIG. 3. As the input voltage changes in a positive direction, the sharp pulse produced by the differentiator is also positive, while a negative sharp pulse is produced by the differentiator when the input voltage changes in a negative direction. In this manner, a sharp positive pulse, as well as a sharp negative pulse, is produced in wave form J for each of the pulses in wave form H. Pulses 126 and 128 are those due to the relatively long pulse or pedestal in wave form H; while pulses 130 and 132 are those due to the defect pulse 110. Wave form J at the output of differentiator 124 is thereafter passed through amplifier 127 to a clipper 129 which removes the positive pulses 126 and 132 in differentiated wave form J to produce wave form K wherein only the negative sharp pulses 130 and 128 remain. These pulses are inverted in amplifier 131 and passed through cathode follower 133 to a delay line 134 which delays the pulses by one-half microsecond to produce wave form L. This wave form, after passing through amplifier 136 is fed to gate circuit 138.

Reverting again to the vidicon 14, its output video wave form G on lead 108 is also passed through amplifier 141 to a Schmitt trigger circuit 142. The voltage level at which the circuit 142 will switch from one stable state to the other is indicated at 144 on wave form G in FIG. 3. Thus, the output voltage of the Schmitt trigger will rise at the leading edge of each relatively long pulse or pedestal in wave form G and will fall at its trailing edge to produce a series of pulses appearing as wave form M in FIG. 3. Each of the pulses in wave form M, it will be noted, have the same pulse width and phase position as a corresponding pedestal in wave form G. These pulses are passed through amplifier 146 to gate circuit 138. By gating wave form L from amplifier 136 with wave form M from amplifier 146, only those pulses in wave form L which coincide with a pulse in wave form M will appear at the output of gate circuit 138. From an examination of FIG. 3, it will be noted that since wave form K was delayed by one-half microsecond to produce wave form L, the pulse 128 due to the trailing edge of the pedestal in the original video wave form, does not coincide with a pulse in wave form M. Consequently, pulse 128 is eliminated in the gate circuit 138 whereby wave form N is applied to a counter 140, this wave form containing only the pulses 130 which were produced by the defect 36 shown in FIG. 2. It is, therefore, apparent that a single spiked pulse will appear at the output of gate circuit 138 for each defect scanned by the electron beam of the camera tube 14. In a similar manner, the pulses 112 and 114 in the original video wave form G produce spiked pulses 150 and 152, and these only are passed through the gate circuit 138 while the spiked pulses due to the leading and trailing edges of the pedestal are eliminated. Thus, the output of counter 140 will be an indication of the number of defects on the surface of the strip 10, and since the frequencies of the vertical and horizontal scans vary as a function of the speed of the material, the number of pulses arriving at counter 144 for a given defect condition will always be the same, regardless of the speed of the material.

If it is desired to determine the defect condition on successive equal increments of the material 10, the output of Schmitt trigger 60 which is wave form F in FIG. 3 may be passed through a one-shot multivibrator 154 (FIG. 1) to a counter 156, the output of the counter 156 being a pulse on lead 158 each time the material 10 has traveled through a predetermined distance. This pulse, then, is used to reset the counter 140 whereby it will again begin counting at the beginning of each incremental length of the material 10. The output of the counter 140 may then be applied to a printer 160 which will produce a printed indication of the defect condition of successive equal increments of the material 10.

As will be understood, speed compensation in the circuit of FIG. 1 was achieved by rendering the horizontal sweep frequency of the vidicon 14 proportional to the speed of the material 10. Speed compensation, however, may also be derived by the circuit shown in FIG. 4. Since many of the circuit elements in FIG. 4 correspond to those already shown and described in connection with FIG. 1, elements in FIG. 4 which correspond to those of FIG. 1 are identified by like reference numerals and are not hereinafter described in detail. The major difference between the circuit of FIG. 4 and that of FIG. 1 is that the output of amplifier 58 is not used to produce the horizontal scanning frequency. Rather, the horizontal scanning frequency originates with a pulse generator 162 which produces a pulsed output of constant frequency. This pulsed output is applied to phantastron 164 which produces the sawtooth output wave from A' shown in FIG. 5. This wave form, unlike wave form E in FIG. 3 is of constant frequency and does not vary in frequency as a function of the speed of the material 10. The wave form A' is passed through amplifier 166 and horizontal output circuit 168 to the horizontal deflection plates 34 of the vidicon 14.

The output of pulse generator 162 is also applied through cathode follower 170 and phase inverter 172 to the blanking output circuit 78. The pulses from generator 162 thus comprise the blanking pulses applied to the control grid 26 of the vidicon 14 for the horizontal sweep.

The circuitry at the output of the vidicon 14 in FIG. 4 is identical to that shown in FIG. 1 except that an additional amplifier 174 and gate circuit 176 are interposed between gate 138 and the counter 140. The output of the gate circuit 138 in FIG. 4 may, for example, appear as wave form B' in FIG. 5 wherein two spiked pulses 178 and 180 are produced each time the electron beam sweeps across the width of the material 10. Furthermore, the pulse 178 and 180 will occur repetitively at a fixed frequency as long as the electron beam sweeps across the defects. Since the horizontal sweep repetition frequency does not vary in the circuit of FIG. 4, the number of spiked pulses appearing in wave from B' will be a function of the speed of the strip. That is, when the speed of the strip is reduced, the electron beam will scan back and forth across the defects for a longer period of time than it would if the speed of the strip were increased.

The output of tachometer generator 50 is shown in FIG. 5 as wave form C' and comprises a sine wave. This wave form, after passing through clipper 56 and amplifier 58 appears as wave form D' in FIG. 5 wherein only the positive half cycles of the wave form remain. The wave form D' is applied to Schmitt trigger circuit 60; and the output of this circuit appears as wave form E' which corresponds to wave form C in FIG. 3. This wave form is applied to a differentiator 182 which produces the wave form F' in FIG. 5 wherein a sharp spiked pulse is produced at the leading and trailing edges of each pulse in wave form E', the pulse at the leading edge being positive while the pulse at the trailing edge is negative. This wave form (wave form F' in FIG. 5) is passed through amplifier 184 to a phantastron 186 and Schmitt trigger circuit 188, the output of the Schmitt trigger circuit being wave form G' which comprises a series of pulses of fixed width as determined by the phantastron 186, with the leading edge of each pulse in wave form G' corresponding with the positive spiked pulses in wave form F'. The wave form G' is then passed through a cathode follower circuit 190 to the gate circuit 176. Thus, wave form E' is gated with wave form G' to produce wave for H' wherein positive spiked pulses are produced only upon coincidence of pulses in wave form G' with those in wave form B'. Since the number of pulses in wave form G' (i.e., the pulse recurrence frequency) is proportional to the speed of strip 10, the number of pulses appearing in wave form H' will also be proportional to speed for a given defect condition.

As long as the electron beam of vidicon 14 sweeps over defects on the surface of strip 10, spiked pulses will appear in wave form B'. This wave form will appear regardless of the speed of the strip 10, just so long as the electron beam scans a defect. The wave form G' at the output of cathode follower 190, however, will be produced only while the strip 10 is moving since it depends upon the frequency at the output of tachometer 50. Furthermore, the frequenecy of the pulses in wave form G' depends upon the speed of the strip when it is moving. Thus, if the speed of the strip were doubled over that assumed for the wave forms given in FIG. 5, then six pulses would appear in wave form G' rather than the three shown. It is, therefore, evident that if the speed of the strip 10 were doubled, the number of pulses in wave form B' which would be passed to gate 176 would also be doubled for the time interval shown; and, in general, it may be said that the number of pulses in wave form B' arriving at gate 176 is proportional to the speed of the strip 10. As the strip travels through the distance $d_1$ (FIG. 2), for example, the number of pulses reaching gate 176 will be the same for the given total defect area regardless of the speed of the strip 10, the only difference being that if the speed of the strip is increased, the time interval required for a given number of pulses to arrive at gate 176 is decreased.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. In apparatus for detecting defects on the surface of moving material in which the defects have a different optical appearance than the remainder of the material, the combination of means including an electron-optics device for full frame scanning an image of the surface of said moving material with an electron beam wherein the beam scans transverse and substantially parallel to the direction of movement of the material, the output of the electron-optics device being a pulsed signal in which a pulse is produced each time the electron beam scans over a defect, and means for counting at least part of the pulses at the output of said eletcron-optics device to obtain an indication of the surface condition of said material.

2. In an apparatus for detecting defects on the surface of moving material in which the defects have a different optical appearance than the remainder of the material, the combination of means including an electron-optics device for full frame scanning an image of the surface of said moving material with an electro beam wherein the beam scans transverse and substantially parallel to the direction of movement of the material, the scanning frequency transverse to the direction of movement being greater than that substantially parallel to the direction of movement, the output of the electron-optics device being a pulsed signal in which a pulse is produced each time the electron beam scans over a defect, and means for counting at least part of the pulses at the output of said electron-optics device to obtain an indication of the surface condition of said material.

3. In apparatus for detecting defects on the surface of moving material in which the defects having a different optical appearance than the remainder of the material, the combination of means including an electron-optics device for full frame scanning an image of the surface of said moving material with an electron beam wherein the beam scans transverse to and substantially parallel to the direction of movement of the material, the scanning frequency transverse to the direction of movement being greater than that substantially parallel to the direction of movement and the speed of the electron beam along said image parallel to the direction of movement being faster than the speed of the image of said moving material, the output of the electron-optics device being a pulsed signal in which a pulse is produced each time the electron beam scans over a defect, and means for counting the pulses at the output of said electron-optics device to obtain an indication of the surface condition of said material.

4. In apparatus for detecting defects on the surface of moving material in which the defects have a different optical appearance than the remainder of the material, the combination of means including an electron-optics device for full frame scanning an image of the surface of said moving material with an electron beam wherein the beam scans transverse and substantially parallel to the direction of movement of the material, the scanning frequency transverse to the direction of movement being greater than that substantially parallel to the direction of movement and the scanning speed of said electron beam parallel to the direction of movement of the material being substantially twice the speed of the image of the surface of said moving material, the output of the electron-optics device being a pulsed signal in which a pulse is produced each time the electron beam scans over a defect, and means for counting at least a portion of the pulses at the output of said electron-optics device to obtain an indication of the surface condition of said material.

5. In apparatus for detecting defects on the surface of moving material in which the defects have a different optical appearance than the remainder of the material, the combination of means including an electron-optics device for full frame scanning an image of the surface of said moving material at a frequency which varies as a function of the speed of said moving material, the output of the electron-optics device being a pulsed signal in which a pulse is produced each time the electron beam scans over a defect, and means for counting the pulses at the output of said electron-optics device to obtain an indication of the surface condition of said material.

6. In apparatus for detecting defects on the surface of moving material in which the defects have a different optical appearance than the remainder of the material, the combination of means including an electron-optics device for full frame scanning an image of the surface of said moving material with an electron beam wherein the beam scans transverse and substantially parallel to the direction of movement of the material at frequencies which vary as a function of the speed of said moving material, the scanning frequency transverse to the direction of movement being greater than that substantially parallel to the direction of movement at all times regardless of the speed of the moving material, the output of the electron-optics device being a pulsed signal in which a pulse is produced each time the electron beam scans over a defect, and means for counting the pulses at the output of said electron-optics device to obtain an indication of the surface condition of said material.

7. In apparatus for detecting defects on the surface of moving material in which the defects have a different optical appearance than the remainder of the material, the combination of means including an electron-optics device for full frame scanning an image of the surface of said moving material with an electron beam wherein the beam scans transverse and substantially parallel to the direction of movement of the material at frequencies which vary as a function of the speed of said moving material, the scanning frequency transverse to the direction of movement being greater than that substantially parallel to the direction of movement and the scanning speed parallel to the direction of movement being substantially twice that of the speed of the image of the surface of the moving material, the output of the electron-optics device being a pulsed signal in which a pulse is produced each time the electron beam scans over a defect, and means for counting the pulses at the output of said electron-optics device to obtain an indication of the surface condition of said material.

8. In apparatus for detecting defects on the surface of moving material in which the defects have a different optical appearance than the remainder of the material, the combination of means including an electron-optics device for full frame scanning an image of the surface of said moving material with an electron beam wherein the beam scans transverse and substantially parallel to the direction of movement of the material, the transverse scanning frequency being fixed, means for varying the scanning frequency substantially parallel to the direction of movement as a function of the speed of said moving material, the output of the electron-optics device being a pulsed signal in which a pulse is produced each time the electron beam scans over a defect, means responsive to the speed of said moving material for gating said pulsed signal to eliminate a portion of the pulses therein and produce a resultant signal, the portion of the pulses eliminated being a function of the speed of said material, and a counter for counting the pulses in said resultant signal.

9. The apparatus of claim 8 and including a device responsive to the speed of said moving material for resetting said counter each time the material has moved through a predetermined distance.

10. In apparatus for detecting defects on the surface of moving material in which the defects have a different optical appearance than the remainder of the material, the combination of means including an electrostatic vidicon for full frame scanning an image of the surface of said material, horizontal and vertical deflection plates in said electrostatic vidicon, means for applying a sawtooth wave form having a frequency which varies as a function of the speed of said moving materail to said vertical deflection plates, means for applying a sawtooth wave form having a frequency which varies as a function of the speed of said moving material to said horizontal deflection plates, the output of the vidicon being a pulsed signal in which a pulse is produced each time the electron beam scans over the image of a defect, and means for counting at least some of the pulses at the output of said vidicon to obtain an indication of the surface condition of said material.

11. In apparatus for detecting defects on the surface of moving material in which the defects have a different optical appearance than the remainder of the material, the combination of means including an electrostatic vidicon for full frame scanning an image of the surface of said material, horizontal and vertical deflection plates in said electrostatic vidicon arranged in planes extending parallel and horizontal to the direction of movement of said material respectively, means for applying a sawtooth wave form having a frequency which varies as a function of the speed of said moving material to said vertical deflection plates whereby the scanning velocity of the electron beam between the vertical deflection plates is substantially twice that of the speed of said moving material, means for applying a sawtooth wave form having a frequency which varies as a function of the speed of said moving material to said horizontal deflection plates with the frequency of the sawtooth wave form applied to said horizontal deflection plates being much higher than the frequency of the wave form applied to the vertical deflection plates, the output of the vidicon being a pulsed signal in which a pulse is produced each time the electron beam scans over the image of a defect, and means for counting the pulses at the output of said vidicon to obtain an indication of the surface condition of said material.

12. In appartus for detecting defects on the surface of moving material in which the defects have a different optical appearance than the remainder of the material, the combination of means including an electrostatic vidicon for full frame scanning an image of the surface of said material, horizontal and vertical deflection plates in said electrostatic vidicon arranged in planes extending parallel and perpendicular to the direction of movement of said material respectively, means for applying a sawtooth wave form having a frequency which varies as a function of the speed of said moving material to said vertical deflection plates, means for applying a sawtooth wave form having a fixed frequency to said horizontal deflection plates, the output of the vidicon being a pulsed signal in which a pulse is produced each time the electron beam scans over a defect, means responsive to the speed of said moving material for gating said pulsed signal to eliminate a portion of the pulses therein and produce a resultant signal, the portion of the pulses eliminated being a function of the speed of said material, and means for counting the pulses in said resultant signal.

13. In apparatus for detecting defects on the surface of moving material in which the defects have a different optical appearance than the remainder of the material, the combination of means including an electrostatic vidicon for full frame scanning an image of the surface of said material, horizontal and vertical deflection plates in said electrostatic vidicon lying in planes extending parallel and perpendicular to the direction of movement of said material respectively, means for applying a sawtooth wave form to said vertical deflection plates, means for applying a sawtooth wave form to said horizontal deflection plates, the frequency of the wave form applied to the horizontal deflection plates being higher than that applied to the vertical deflection plates, the output of the electron-optics device being a pulsed signal in which a pulse is produced each time the electron beam scans over the image of a defect, and means for counting the pulses at the output of said electron-optics device to obtain an indication of the surface condition of said material.

14. In apparatus for detecting defects on the surface of moving material in which the defects have a different optical appearance than the remainder of the material, the combination of means including an electron-optics device for full frame scanning an image of the surface of said material with an electron beam to produce a pulsed output signal in which a pulse is produced each time the electron beam scans over a defect, means for counting at least part of the pulses at the output of said electron-optics device to obtain an indication of the surface condition of said material, and a device responsive to the speed of said moving material for resetting said counter each time the material has moved through a predetermined distance.

References Cited in the file of this patent

UNITED STATES PATENTS

| | | |
|---|---|---|
| 2,731,200 | Koelsch | Jan. 17, 1956 |
| 2,975,293 | Kruse et al. | Mar. 14, 1961 |
| 3,019,346 | Laycak | Jan. 30, 1962 |
| 3,019,347 | Laycak | Jan. 30, 1962 |
| 3,019,972 | Strother | Feb. 6, 1962 |
| 3,026,415 | Lake et al. | Mar. 20, 1962 |
| 3,088,036 | Hobbs | Apr. 30, 1963 |